United States Patent Office 3,341,455
Patented Sept. 12, 1967

3,341,455
LUBRICANTS CONTAINING COPOLYMERIC NITROGEN COMPOUNDS
Lester E. Coleman, Cleveland, Ohio, assignor to The Lubrizol Corporation, Wickliffe, Ohio, a corporation of Ohio
No Drawing. Filed Feb. 1, 1967, Ser. No. 613,092
8 Claims. (Cl. 252—51.5)

ABSTRACT OF THE DISCLOSURE

N-3-oxohydrocarbon-substituted acrylamides, particularly N-(1,1-dimethyl-3-oxobutyl)acrylamide (also known as diacetone acrylamide), are prepared by the reaction of one mole of an acrylonitrile with one mole of a β-hydroxy oxohydrocarbon or an α,β-unsaturated ketone or aldehyde, or with two moles of an oxohydrocarbon (aldehyde or ketone having at least one α-hydrogen atom) in the presence of sulfuric acid. The acrylamides form polymers, many of which are oil-soluble and are useful as lubricant additives to improve viscosity, lower the pour point, and inhibit foaming.

RELATED APPLICATIONS

This application is a continuation-in-part of copending application Ser. No. 553,647, filed May 31, 1966, now abandoned. Said application is a continuation-in-part of Ser. No. 401,632, filed Oct. 5, 1964, now abandoned, which is a division of Ser. No. 326,394, filed Nov. 27, 1963, now U.S. Patent 3,277,056, which in turn is a continuation-in-part of Ser. No. 138,712, filed Oct. 30, 1961, now abandoned.

SUMMARY OF THE INVENTION

This invention relates to nitrogen-containing polymers, and more particularly to lubricating compositions containing an interpolymer of (A) an N-3-oxohydrocarbon-substituted acrylamide having the formula

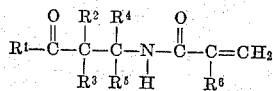

wherein each of $R^1$, $R^2$, $R^3$, $R^4$, $R^5$ and $R^6$ is individually hydrogen or a lower alkyl radical, with (B) at least about 50% by weight of at least one oil-solubilizing monomer having at least eight aliphatic carbon atoms.

Acrylamides can be polymerized to form polymers that are useful in the manufacture of plastics, resins, synthetic lubricants, fibers, additives in hydrocarbon oils, etc. The utility of the polymers is predicated to a large measure upon the polar character of the amide radical which causes the polymers to be compatible with many other organic substances, and a principal object of this invention is to provide acrylamides in which the polar character of the amide radical is enhanced and to provide polymers of such acrylamides.

It is also an object of this invention to provide novel compositions of matter.

It is also an object of this invention to provide methods for preparing acrylamides and polymers of acrylamides.

It is further an object of this invention to provide polymers of acrylamides which are suitable for use in organic substances, especially in hydrocarbon oils.

It is still further an object of this invention to provide hydrocarbon oil compositions such as fuels and lubricants containing polymers of acrylamides.

Other objects will in part be obvious and will in part appear hereinafter.

THE MONOMERS

In the above formula, the radicals $R^{1-6}$ are hydrogen or lower alkyl; the term "lower alkyl" as used herein includes acyclic and cyclic radicals containing no more than about 10 carbon atoms. These radicals are exemplified by methyl, ethyl, n-butyl, isobutyl, sec-butyl, n-octyl, 4-ethyl-2-hexyl, cyclopentyl, and cyclohexyl. In a preferred embodiment of the invention, $R^2$ and $R^3$ are hydrogen, $R^1$, $R^4$ and $R^5$ are lower alkyl, and $R^6$ is hydrogen or methyl, desirably hydrogen.

Specific examples of the N-3-oxohydrocarbon-substituted acrylamides include N-3-oxopropylacrylamide, N-3-oxobutylacrylamide, N-(1-methyl-3-oxobutyl)acrylamide, N-(1,1-dimethyl-3-oxobutyl)acrylamide, N-(1-methyl-1,3-dicyclohexyl-3-oxopropyl)acrylamide, N-(1,2-dimethyl-1-ethyl-3-oxobutyl)acrylamide, N-(1,5-dimethyl-1-isopropyl-3-oxohexyl)acrylamide, N-(1,1-diisobutyl-2-isopropyl-5-methyl-3-oxohexyl)acrylamide, N-(1,1-dibutyl-2-n-propyl-3-oxoheptyl)acrylamide, and N-(1-methyl-3-oxobutyl)methacrylamide. The preferred compound is N-(1,1-dimethyl-3-oxobutyl)acrylamide, hereinafter referred to as diacetone acrylamide.

A convenient method for making the N-3-oxohydrocarbon-substituted acrylamides of this invention involves reacting a β-hydroxy oxohydrocarbon, i.e., ketone or aldehyde, with one mole of an acrylonitrile in the presence of at least one mole of sulfuric acid per mole of the acrylonitrile used and subsequently hydrolyzing the reaction mixture. The reaction is illustrated by that of diacetone alcohol (4-hydroxy-4-methyl-2-pentanone) with acrylonitrile as represented by the following equations.

A. $CH_2=CH-C\equiv N + H_2SO_4 \longrightarrow$ 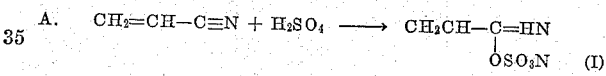 (I)

B. 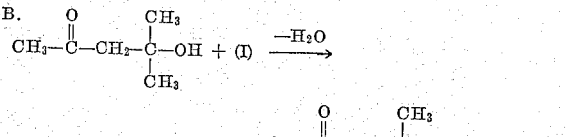

(II)

C. 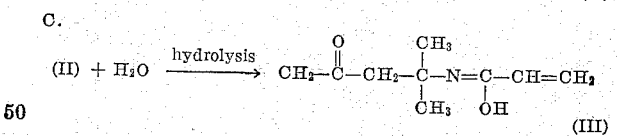

(III)

D. 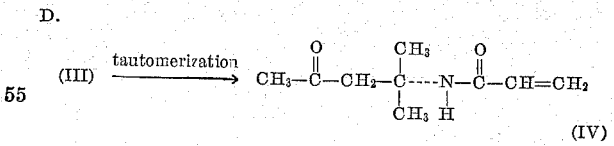

(IV)

It is to be understood, of course, that the above equations are merely illustrative and may be accurate only as to the stoichiometry of the reaction.

The reaction of the acrylonitrile with the hydroxy ketone or aldehyde is best carried out at a temperature below about 100° C. A higher temperature appears to promote undesirable side reactions such as polymerization of the acrylonitrile, or polymerization of the acrylamide product. The preferred temperature for the reaction is within the range of from about 0° C. to about 70° C. The reaction is in most instances exothermic; hence, external cooling may be necessary to maintain the reaction temperature within the stated ranges.

The hydrolysis step is effected most conveniently by contacting the reaction product of the hydroxy ketone or aldehyde and the acrylonitrile with ice or a mixture of ice and water, care being taken to maintain the temperature for hydrolysis below about 100° C., preferably from about 0° C. to 70° C. The product of hydrolysis is the desired acrylamide. It may be purified by distillation in vacuum, although in many instances the product is of sufficient purity that any purification step is optional. Inasmuch as the acrylamide is susceptible to polymerization, distillation should be carried out in the presence of a polymerization inhibitor such as hydroquinone.

The beta-hydroxy oxohydrocarbons are preferably aliphatic. They in turn are prepared by the condensation of two moles of an aliphatic oxohydrocarbon, viz, ketone or aldehyde, having at least one α-hydrogen atom, i.e., hydrogen atom attached to the carbon atom which in turn is attached directly to the carbonyl group of the ketone or aldehyde. Such condensation is otherwise known in the art as the "aldol" condensation. It is illustrated by the formation of diacetone alcohol or the formation of β-hydroxybutanal from acetone or acetaldehyde, respectively, as represented by the following equations.

E. 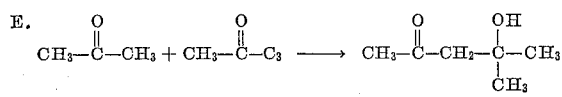

F. 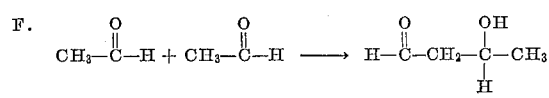

The condensation is catalyzed by either an acid such as sulfuric acid or a base and takes place readily upon mixing the aldehyde or ketone with the catalyst. It can be effected at temperatures within wide ranges such as from room temperature to 200° C.

It is apparent that the condensation of two moles of diethyl ketone results in a β-hydroxy heptanone (viz, 5-hydroxy-4-methyl-5-ethyl-3-heptanone) and that other ketones or aldehydes having an α-hydrogen atom can be converted by such condensation to a wide variety of β-hydroxy oxohydrocarbons. It is likewise apparent that heterogeneous condensation of one mole of a ketone or aldehyde with another mole of a different ketone or aldehyde results also in a β-hydroxy oxohydrocarbon which is useful in the reaction with acrylonitriles to produce the N-3-oxohydrocarbon-substituted acrylamides.

A more convenient method for preparing the N-3-oxohydrocarbon-substituted acrylamides involves the reaction of an acrylonitrile with two moles of the oxohydrocarbon described previously (i.e., a ketone or aldehyde having at least one α-hydrogen atom) in the presence of at least one mole of sulfuric acid. The conditions for the reaction are substantially the same as those for the reaction of the previous method. One theory regarding the reaction of this method postulates that the two moles of the oxohydrocarbon condense in situ to form the β-hydroxy oxohydrocarbon (as described by Equations E or F previously) and that the beta-hydroxy oxohydrocarbon thus formed combines with the acrylonitrile in accordance with the reaction as illustrated by Equations A, B, C, and D previously. In this respect, the second method may be regarded as a modified version of the first method.

Still another method for preparing the N-3-oxohydrocarbon-substituted acrylamides involves the reaction of an acrylonitrile with an α,β-unsaturated ketone or aldehyde such as is obtained by the dehydration of the β-hydroxy oxohydrocarbon described above. The conditions for this reaction likewise are substantially the same as those for the reactions of the first two methods. Specific examples of the unsaturated ketones or aldehydes are mesityl oxide, 1-buten-3-one, and 2-pentenal.

The following examples are illustrative of the methods for preparing the N-oxohydrocarbon-substituted acrylamides.

*Example 1*

A mixture of 185.5 grams (3.5 moles) of acrylonitrile and 406 grams (7 moles) of acetone is added dropwise to 686 grams (7 moles) of concentrated sulfuric acid while the reaction mixture is maintained by external cooling at a temperature between 5° C. and 25° C. Thereafter the mixture is allowed to warm to 35°–40° C. and then poured slowly over ice. The resulting mixture is neutralized with sodium hydroxide and the aqueous layer extracted with benzene. The organic layer and the benzene solution are combined, dried with calcium chloride, and filtered. The filtrate is heated to distill the benzene. The residue is distilled in vacuum and diacetone acrylamide is collected as the distillate at 93°–100° C./0.1–0.3 mm. The product has a nitrogen content of 8% (theory: 8.3%) and a molecular weight of 163 (theory: 169).

*Example 2*

N-(1-methyl - 1 - ethyl-3-oxopentyl)acrylamide is prepared by the process of Example 1 except that acetone is replaced with methyl ethyl ketone (505 grams, 7 moles). The product is collected as the distillate at 97°–103° C./0.1–0.3 mm. and is found to have a nitrogen content of 6.9%.

*Example 3*

N-[1,5-dimethyl - 1 - (2-methyl-1-propyl)-3-oxohexyl] acrylamide is prepared by the process of Example 1 except that acetone is replaced with methyl isobutyl ketone (701 grams, 7 moles). The product is collected as the distillate at 103°–110° C./0.3–0.5 mm.

*Example 4*

A mixture of 265 grams (5 moles) of acrylonitrile and 581 grams (5 moles) of diacetone alcohol (4-hydroxy-4-methyl-2-pentanone) is added portionwise below 40° C. to 735 grams (7.5 moles) of concentrated sulfuric acid. The reaction mass is poured over ice and neutralized with sodium hydroxide. The inorganic layer is extracted with benzene and the benzene extract combined with the organic layer from the neutralization mixture. The combined layers are heated to distill off benzene and the residue is treated with petroleum ether to give a precipitate of diacetone acrylamide, which is found to have a nitrogen content of 8.3% and a molecular weight of 176.

*Example 5*

A mixture of 159 grams (3 moles) of acrylonitrile and 294 grams (3 moles) of mesityl oxide is added to 323 grams (3.3 moles) of concentrated sulfuric acid in 45 minutes at 25°–45° C. The resulting mixture is placed in a warm water bath for 16 hours, hydrolyzed with ice, and neutralized with sodium hydroxide. The neutralized mixture is extracted with benzene and the benzene layer is then dried, filtered, and heated to 80° C./42 mm. The residue is heated further to give diacetone acrylamide as the distillate boiling at 153°–183° C./20 mm. and having a nitrogen content of 8.1%.

THE POLYMERS

The N-3-oxohydrocarbon-substituted acrylamides are for the most part liquids, amorphous solids, or crystalline solids. Their principal utility is as monomers for conversion to polymers which are useful as additives in paints, fuel oils, lubricants, and insecticidal compositions. It will be understood that for the purposes of the specification and claims of this invention the term "polymers" is used in a generic sense to include homopolymers, copolymers, terpolymers, or other interpolymers.

The N-3-oxohydrocarbon-substituted acrylamides are usually polymerized by the free-radical polymerization technique (also known as the addition polymerization technique). Such technique consists of contacting the monomer with a polymerization initiator either in the absence or presence of a diluent at a temperature usually between 0° C. and 200° C. The polymerization initiator is a substance capable of liberating a free radical under the conditions of polymerization, e.g., benzoyl peroxide, tert-butyl hydroperoxide, cumyl peroxide, potassium persulfate, acetyl peroxide, hydrogen peroxide, azobisisobutyronitrile, or perbenzoic acid. For reasons of economy, benzoyl peroxide or azobisisobutyronitrile are most commonly used.

The N-3-oxohydrocarbon-substituted acrylamides may also be polymerized or copolymerized using an anionic initiator such as naphthylsodium or butyllithium in tetrahydrofuran solution or sodium metal in liquid ammonia solution.

The polymerization of N-3-oxohydrocarbon-substituted acrylamides may also be effected by other polymerization techniques such as by the use of Ziegler type catalysts, gamma ray irradiation, or thermal techniques.

The diluent for the polymerization mixture may be either an inert solvent such as benzene, toluene, xylene, cyclohexane, n-hexane, naptha, tetrahydrofuran, white oil, or dodecane; or a non-solvent such as water or liquid ammonia. Thus, the polymerization can be carried out in bulk, solution, emulsion, or suspension.

The temperature for the polymerization depends on the catalyst system employed and to some extent upon the nature of the monomers to be polymerized. Thus, the copolymerization of acrylonitrile with the acrylamide of this invention may be catalyzed by an anionic initiator at temperatures from about −100° C. to 50° C., preferably at −70° C. to 0° C. On the other hand, the optimum temperature for effecting the free radical catalyzed homopolymerization of the acrylamides of this invention is usually from 0° C. to 100° C., preferably 30° C. to 80° C. Similarly, the optimum temperatures for effecting the free radical catalyzed interpolymerization of the acrylamide with one or more polymerizable comonomers will vary according to the reactivity of these monomers. In most instances such temperatures likewise are within the range from about 0° C. to 100° C.

A large variety of comonomers can be used to form interpolymers with the acrylamides of this invention. For the most part, the comonomers are polymerizable vinyl monomers. They include, for example, (1) esters of unsaturated alcohols, (2) esters of unsaturated acids, (3) vinyl cyclic compounds, (4) unsaturated ethers, (5) unsaturated ketones, (6) unsaturated amides, (7) unsaturated aliphatic hydrocarbons, (8) vinyl halides, (9) esters of unsaturated polyhydric alcohols (e.g., butenediol), (10) unsaturated acids, (11) unsaturated acid anhydrides, (12) unsaturated acid chlorides, and (13) unsaturated nitriles.

Specific illustrations of such compounds are:

(1) Esters of unsaturated alcohols: Allyl, methallyl, crotyl, 1-chloroallyl, 2-chloroallyl, cinnamyl, vinyl, methylvinyl, 1-phenallyl, butenyl, etc., esters of (a) saturated acids such as for instance, acetic, propionic, butyric, valeric, caproic, stearic, etc.; (b) unsaturated acids such as acrylic, alpha-substituted acrylic (including alkacrylic, e.g., methacrylic, ethylacrylic, propylacrylic, etc., and arylacrylic such as phenylacrylic, etc.), crotonic, oleic, linoleic, linolenic, etc., (c) polybasic acids such as oxalic, malonic, succinic, glutaric, adipic, pimelic, suberic, azelaic, sebacic, etc., (d) unsaturated polybasic acids such as maleic, fumaric, citraconic, mesaconic, itaconic, methylenemalonic, acetylenedicarboxylic, aconitic, etc., (e) aromatic acids, e.g., benzoic, phenylacetic, phthalic, terephthalic, benzoylphthalic, etc.

(2) The esters of saturated alcohols such as methyl, ethyl, propyl, isopropyl, butyl, isobutyl, sec-butyl, tert-butyl, 2-ethylhexyl, cyclohexyl, behenyl, etc., with unsaturated aliphatic monobasic and polybasic acids, examples of which are illustrated above. The alkyl acrylates and methacrylates in which the alkyl radical contains from 1 to about 30 carbon atoms are especially useful because of their reactivity in interpolymerization and the particular utility and effectiveness of their interpolymers for the purpose of this invention.

(3) Esters of unsaturated polyhydric alcohols, e.g., butenediol, etc., with saturated and unsaturated aliphatic and aromatic, monobasic and polybasic acids, illustrative examples of which appear above.

(4) Vinyl cyclic compounds including (a) monovinyl aromatic hydrocarbons, e.g., styrene, o-, m-, p-chlorostyrenes, -bromostyrenes, -fluorostyrenes, -methylstyrenes, -ethylstyrenes, -cyanostyrenes, di-, tri-, and tetra-, etc., -chlorostyrenes, -bromostyrenes, -fluorostyrenes, -methylstyrenes, -ethylstyrenes, -cyanostyrenes, vinylnaphthalene, vinylcyclohexane, vinylfuran, vinylpyridine, vinylbenzofuran, divinylbenzene, trivinylbenzene, allylbenzene, N-vinylcarbazole, N-vinylpyrrolidone, N-vinyloxazolidone, etc.

(5) Unsaturated ethers such as, e.g., methyl vinyl ether, ethyl vinyl ether, cyclohexyl vinyl ether, octyl vinyl ether, diallylether, ethyl methallyl ether, allyl ethyl ether, etc.

(6) Unsaturated ketones, e.g., methyl vinyl ketone, ethyl vinyl ketone, etc.

(7) Unsaturated amides, such as acrylamide, N-methylacrylamide, N-phenylacrylamide, N-allylacrylamide, N-methylolacrylamide, N-allylcaprolactam, etc.

(8) Unsaturated aliphatic hydrocarbons, for instance, ethylene, propylene, butenes, butadiene, isoprene, 2-chlorobutadiene, alpha-olefins, etc.

(9) Vinyl halides, e.g., vinyl fluoride, vinyl chloride, vinyl bromide, vinyl iodide, vinylidene chloride, vinylidene bromide, allyl chloride, allyl bromide, etc.

(10) Unsaturated acid anhydrides, e.g., maleic, citraconic, propylacrylic, etc., examples of which appear above.

(11) Unsaturated acid anhydrides, e.g., maleic citraconic, itaconic, cis-4-cyclohexene-1,2-dicarboxylic, bicyclo (2.2.1)5-heptene-2,3-dicarboxylic, etc.

(12) Unsaturated acid halides such as cinnamoyl, acrylyl, methacrylyl, crotonyl, oleyl, fumaryl, etc.

(13) Unsaturated nitriles, e.g., acrylonitrile, methacrylonitrile and other substituted acrylonitriles.

The relative proportions of the N-3-oxohydrocarbon-substituted acrylamides and the vinyl comonomers to be used in interpolymerization depend upon the reactivity of these monomers as well as the properties desired for the interpolymers to be formed. To illustrate, interpolymers in which rigidity is desired are obtained by polymerization of a mixture of monomers having a few substitutions or substitutions of relatively short chain length. If a still higher degree of rigidity is desired, a monomer mixture may be used in which a small amount of a bifunctional monomer is included such as divinylbenzene which will crosslink the polymer. On the other hand, interpolymers having a high degree of solubility in a hydrocarbon oil are obtained from a polymerization mixture containing a relatively high proportion of an oil-solubilizing monomer, i.e., one having an aliphatic group containing at least about 8 carbon atoms. For most applications, it has been found that the oil-solubilizing monomer should comprise at least about 50% (by weight), preferably at least about 75%, of the interpolymer.

The preparation of polymers of the N-3-oxohydrocarbon-substituted acrylamides is illustrated by the following examples.

*Example 6*

A polymer is prepared by placing 15 grams of diacetone acrylamide, 15 grams of benzene, and 0.1 gram of azobisisobutyronitrile in a sealed bottle in a nitrogen atmosphere and placing the bottle in a constant temperature bath at 50°–53° C. for 24 hours. The resulting benzene solution is diluted with methanol and then mixed with water to precipitate a pale yellow solid polymer of the acrylamide.

*Example 7*

A copolymer of decyl acrylate and diacetone acrylamide is obtained by placing 36 grams of decyl acrylate, 4 grams of diacetone acrylamide, 40 grams of benzene, and 0.1 gram of azobisisobutyronitrile in a sealed bottle in a nitrogen atmosphere and placing the bottle in a constant temperature bath at 52° C. for 20 hours. The polymer is precipitated from the benzene solution with methanol.

Example 8

A copolymer is prepared by stirring 53 grams (0.315 mole) of diacetone acrylamide, 147 grams (0.314 mole) of a dialkyl fumarate in which each alkyl radical is derived from a commercial mixture of primary alkanols having 12 to 14 carbon atoms, 200 grams of benzene, and 1 gram of benzoyl peroxide at 45° C.–77° C. in a nitrogen atmosphere for 3.5 hours. The polymer is precipitated from the benzene solution with methanol and is found to have a nitrogen content of 3.2%.

Example 9

A terpolymer of diacetone acrylamide, vinyl acetate, and a dialkyl fumarate in which each alkyl radical is derived from a commercial mixture of alkanols having from 12 to 16 atoms, is prepared by placing 10 grams of diacetone acrylamide, 24.8 grams of vinyl acetate, 165.2 grams of the fumarate, 1 gram of benzoyl peroxide and 150 grams of benzene in a sealed bottle and placing the bottle in a constant temperature bath at 60° C. for 18 hours. The polymer is precipitated from the benzene solution with methanol and is found to have a nitrogen content of 0.53%.

Example 10

A terpolymer of diacetone acrylamide, N-vinylpyrrolidone, and the dialkyl fumarate of Example 8 is prepared by placing 27.7 grams of diacetone acrylamide, 18.2 grams of N-vinylpyrrolidone, 154 grams of the fumarate, 1 gram of benzoyl peroxide, and 150 grams of benzene in a sealed bottle in a nitrogen atmosphere and placing the bottle in a constant temperature bath at 60° C. for 20 hours. The polymer is precipitated with methanol.

Example 11

A terpolymer of diacetone acrylamide, N-vinyloxazolidone, and the dialkyl fumarate of Example 8 is obtained by placing 35.5 grams of diacetone acrylamide, 12.8 grams of N-vinyloxazolidone, 151.7 grams of the fumarate, 0.2 gram of azo-bisisobutyronitrile, and 150 grams of benzene in a sealed bottle in a nitrogen atmosphere and placing the bottle in a constant temperature bath at 60° C. for 22 hours. The polymer is precipitated with methanol.

Example 12

A terpolymer of diacetone acrylamide, isoprene, and the dialkyl fumarate of Example 9 is obtained by placing 28.7 grams of diacetone acrylamide, 11.6 grams of isoprene, 159.7 grams of the fumarate, 0.2 gram of azo-bisisobutyronitrile and 150 grams of benzene in a sealed bottle in a nitrogen atmosphere and placing the bottle in a constant temperature bath at 60° C. for 22 hours. The polymer is precipitated with methanol.

Example 13

A copolymer of decyl acrylate (36 parts by weight) and N-(1-methyl-1-ethyl - 3 - oxopentyl)acrylamide (4 parts) is obtained by the procedure of Example 7. The copolymer is found to have a nitrogen content of 0.73% (theory: 0.71%).

Example 14

A copolymer of decyl acrylate (36 parts by weight) and N-[1,5-dimethyl - 1 - (2-methyl - 1 - propyl)-3-oxohexyl]acrylamide (4 parts) is prepared by the procedure of Example 7. The copolymer is found to have a nitrogen content of 0.51%.

Example 15

A copolymer of decyl acrylate and diacetone acrylamide (85:15 weight ratio) is prepared by the procedure of Example 7.

Example 16

A copolymer of acrylonitrile and diacetone acrylamide is prepared by mixing together 80 grams (1.51 mole) of acrylonitrile, 20 grams (0.118 mole) of diacetone acrylamide, and 100 grams of tetrahydrofuran, and slowly adding at —25° C. an anionic polymerization catalyst formed by dissolving 2.3 grams (0.10 mole) of sodium metal and 12.8 grams (0.10 mole) of naphthalene in 30 grams of tetrahydrofuran. The mixture is allowed to warm to room temperature and an exothermic reaction occurs causing the temperature to rise to 50° C. The precipitated polymer is filtered from the solution and is purified by dissolving it in dimethylformamide and reprecipitating by addition of methanol. The dried polymer is found to have a nitrogen content of 23.5%.

Example 17

Diacetone acrylamide is polymerized by placing 50 grams thereof in 150 grams of liquid ammonia containing 2 grams of dissolved sodium metal at —70° C., stirring the mixture for one hour at —35° C. to —70° C., and then allowing the mixture to warm to room temperature with evaporation of the ammonia. The polymer is purified by dissolving it in aqueous 90% methanol, acidifying the solution with dilute hydrochloric acid, filtering the flocculent rubbery polymer which precipitates on standing, and washing it with water. The polymer is further purified by dissolving it in acetone and reprecipitating by addition of methanol. The dried polymer is found to have a nitrogen content of 8.3%.

Example 19

A solution is prepared from 36 grams of diacetone acrylamide, 204 grams of 2-ethylhexyl acrylate, and 0.6 gram of benzoyl peroxide in 360 grams of toluene. Onefifth of this solution is heated to 96° C. under nitrogen; an exothermic reaction occurs and the temperature rises spontaneously to 101° C. as polymerization takes place. Over 4 hours, the remaining four-fifths of the toluene solution (which is kept under nitrogen at all times) is added at 100°–115° C. The solution is heated at 115° C. for 1½ hours after the addition is complete, and is then filtered. There is obtained a 40% solution in toluene of a copolymer of diacetone acrylamide with 2-ethylhexyl acrylate. A sample of the copolymer, after precipitation by methanol and drying, contains 1.22% nitrogen (theory 1.24%).

The polymers and interpolymers of the N-3-oxohydrocarbon-substituted acrylamides of this invention are useful for many purposes. To a large extent, the particular utility of such polymers is associated with the presence of the oxo-radical in the acrylamide units. Thus, it has been found that the oxo-radical enhances the polar characteristic of the polymer and this results, for instance, in a greater detergency of the polymer when used as an additive in fuels or lubricants. It results also in a greater compatibility of the polymers with organic dyes so that synthetic fibers prepared from such polymers are readily susceptible to artificial coloring and further are characterized by a high degree of color-fastness.

LUBRICANTS

When added to a lubricant, the polymers of the N-3-oxo-hydrocarbon-substituted acrylamides impart detergent properties, improve viscosity index values, inhibit foaming, and lower the pour point of the lubricant. Mineral lubricating oils are especially susceptible to such improvement. The commonly used oils are those having viscosity values ranging from about 50 SUS (Saybolt Universal seconds) at 100° F. to 500 SUS at 210° F. and are preferably refined mineral lubricating oils from SAE 5 to SAE 120 grades. Other lubricating oils such as vegetable oils, animal oils, silicone oils, and synthetic polyester oils, likewise are susceptible to improvement by the incorporation of the polymers. The concentration of the polymer when used as a viscosity index improver or pour point depressant in a lubricant ranges from 0.1 to 10 parts by weight, more often from 0.5 to 5 parts, per 100 parts of lubricating oil. When used as an anti-foam agent, the polymer may be present in amounts as low as 0.0001 part per 100 parts of oil.

Lubricants containing polymers of this invention may contain also other conventional additives such as metal detergents (e.g., barium didodecyl benzenesulfonate, calcium mahogany sulfonate); inhibitors (e.g., zinc dioctylphosphorodithioate, dioctyl phosphite, phenyl beta-naphthylamine, 2,6-di-tert-butyl-4-methyl-phenol); load-carrying additives (e.g., chlorinated wax, dicyclohexyl disulfide); supplemental viscosity index-improving agents; etc.

The viscosity index-improving properties of the polymers of this invention are illustrated by the results in the table below. The base oil referred to in the results is a SAE 10W–30 mineral base oil having a viscosity value of 46.5 SUS/210° F. and a viscosity index value of 95. The concentration of the polymeric additive of this invention in the lubricant is 1.5% by weight.

| Lubricant: | Viscosity index value |
|---|---|
| Base oil | 95 |
| Base oil+polymer of Example 8 | 140 |
| Base oil+polymer of Example 11 | 111 |
| Base oil+polymer of Example 13 | 107 |
| Base oil+polymer of Example 14 | 137 |
| Base oil+polymer of Example 15 | 123 |

The effectiveness of the polymers of this invention to lower the pour point of lubricants is shown by the results in the following table. The base oil referred to in these results is SAE 10 mineral lubricating oil having a pour point of −10° F.

| Lubricant: | Pour point, °F. |
|---|---|
| Base oil | −10 |
| Base oil+0.25% of polymer of Example 11 | −20 |
| Base oil+0.25% of polymer of Example 12 | −15 |
| Base oil+0.25% of polymer of Example 13 | −25 |

The effectiveness of the polymers of this invention as additives in lubricants to impart detergent properties is shown by the results of a detergency test. In this test a 350-cc. sample of a lubricating oil containing the detergent additives is placed in a 2″ × 15″ borosilicate tube, A steel panel is immersed in the oil. The sample is heated at 300° F. for 96 hours while air is bubbled through the oil at the rate of 10 liters per hour. The oxidized sample is cooled to 120° F., mixed with 0.5% of water, homogenized, allowed to stand at room temperature for 24 hours, and then filtered through two layers of No. 1 Whatman filter paper at 20 mm. mercury pressure. The weight of the precipitate, washed with naphtha and dried, is taken as a measure of the effectiveness of the additive, i.e., the greater the weight of precipitate the less effective the additive. The lubricating oil used in the test was a Mid-Continent conventionally refined petroleum oil having a viscosity of about 200 SUS at 100° F. and containing 0.001% by weight of iron naphthenate (to promote oxidation). The following results were obtained.

| Lubricant: | Detergency test, mg. of sludge deposit/100 cc. sample |
|---|---|
| Base oil | 1000 |
| Base oil+1.5% of the polymer of Example 8 | 3.2 |
| Base oil+1.5% of the polymer of Example 16 | 15 |
| Base oil+1.5% of a polymer of decyl acrylate and N-octyl acrylamide (85:15 weight ratio) | 205 |

The effectiveness of the polymers of this invention as foam inhibitors in gear lubricants and the like is shown by the results of the ASTM Foam Test (D892). In this test, 200 ml. of the lubricant being tested is heated to 120° F. and is then allowed to cool to 75° F. A 1000-ml. graduated cylinder is then charged with 190 ml. of the sample and is maintained at a constant temperature of 75° F. while a current of air is bubbled through the sample for 5 minutes. The volume of foam is immediately recorded and the sample is allowed to stand for 10 minutes, at the end of which time the foam volume is recorded again. (These values are given in order of observation in column I of the following table.) A second portion of the lubricant (180 ml.) is heated to 200° F and air is bubbled through in the same manner, with the volume of foam immediately after the air passage and after standing for 10 minutes being recorded (column II). Finally, the 200° F. sample is cooled to 75° F. and the test is run a third time (column III).

Results of the ASTM Foam Test are given below. The base oil is an SAE 90 mineral oil containing, per 100 parts by weight of oil, 1.32 parts of the reaction product of hydroxypropyl O,O - di - (4-methyl-2-pentyl)-phosphorodithioate, phosphorus pentoxide and a mixture of tertiary alkyl primary amines in which the tertiary alkyl radicals contain from 11 to 14 carbon atoms; 4.54 parts of an isobutene polysulfide; 0.15 part of 1-(2-hydroxy ethyl)-2-heptadecylimidazoline; 0.096 part of stearamide; and 0.076 part of a silicone anti-foam agent.

| Sample | Foam Volume, ml. | | |
|---|---|---|---|
| | I | II | III |
| Base oil | 230–0 | 250–0 | 340–20 |
| Base oil containing 0.02% of the polymer solution of Example 19 | 20–0 | 0–0 | 0–0 |

The polymers of this invention also inhibit foam in lubricating oils, as shown by the following results of the ASTM Foam Test wherein the base oil is an SAE 30 motor oil containing 2.5% of a basic barium salt of a phosphosulfurized petroleum hydrocarbon, 1.5% of a polybutenyl succinic anhydride-polyethylene amine reaction product, and 0.6% of a zinc salt of a mixture of diisobutyl and di-n-amyl phosphorodithioic acids.

| Sample | Foam Volume, ml. | | |
|---|---|---|---|
| | I | II | III |
| Base oil | 480–0 | 40–0 | 470–30 |
| Base oil containing 0.0005% of the polymer of Example 19 | 10–0 | 60–0 | 0–0 |
| Base oil containing 0.0001% of the polymer of Example 19 | 140–0 | 20–0 | 220–10 |

The polymers of this invention are also useful as additives in hydrocarbon fuels to impart resistance to deterioration and formation of sludge or varnish deposits in use or storage. For such use, the concentration of the polymer in the fuel may be as low as 0.001% usually from 0.005% to 0.1%.

What is claimed is:

1. A lubricating composition comprising 100 parts by weight of a lubricating oil and up to about 10 parts of an oil-soluble interpolymer of (A) an N-3-oxohydrocarbon-substituted acrylamide having the structural formula

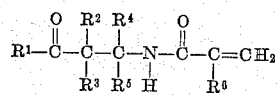

wherein each of $R^1$, $R^2$, $R^3$, $R^4$, $R^5$ and $R^6$ is individually hydrogen or a lower alkyl radical, with (B) at least about 50% by weight of at least one oil-solubilizing monomer having at least eight aliphatic carbon atoms.

2. The lubricating composition of claim 1 where $R^1$ is methyl.

3. The lubricating composition of claim 1 wherein $R^2$ and $R^3$ are hydrogen, and $R^4$ and $R^5$ are alkyl groups.

4. The lubricating composition of claim 1 wherein $R^6$ is hydrogen.

5. A lubricating composition according to claim 1 comprising 100 parts by weight of a lubricating oil and up to about 10 parts of an oil-soluble interpolymer of (A) an N-3-oxohydrocarbon-substituted acrylamide having the structural formula

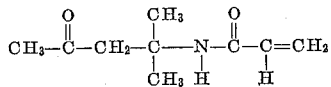

with (B) at least about 50% by weight of at least one oil-solubilizing monomer having at least eight aliphatic carbon atoms.

6. The lubricating composition of claim 5 wherein component B has at least eight aliphatic carbon atoms and is an ester of an α,β-unsaturated acid having up to about 9 carbon atoms and a saturated or unsaturated alcohol having up to about 30 carbon atoms.

7. The lubricating composition of claim 6 wherein component B is 2-ethylhexyl acrylate.

8. The lubricating composition of claim 7 wherein the interpolymer contains at least 75% by weight of 2-ethylhexyl acrylate units.

References Cited

UNITED STATES PATENTS

| | | | |
|---|---|---|---|
| 2,666,044 | 1/1954 | Catlin | 252—51.5 X |
| 2,892,786 | 6/1959 | Stewart et al. | 252—51.5 |
| 3,052,648 | 9/1962 | Bauer | 252—51.5 X |
| 3,277,056 | 10/1966 | Coleman | 252—51.5 X |

DANIEL E. WYMAN, *Primary Examiner.*

P. P. GARVIN, *Assistant Examiner.*